Nov. 19, 1929.   P. DE MATTIA   1,735,896
COLLAPSIBLE CORE STRUCTURE
Filed Jan. 6, 1927   5 Sheets-Sheet 1

Fig.1.

INVENTOR
Peter De Mattia
BY
ATTORNEYS

INVENTOR
Peter De Mattia

Patented Nov. 19, 1929

1,735,896

UNITED STATES PATENT OFFICE

PETER DE MATTIA, OF PASSAIC, NEW JERSEY, ASSIGNOR, BY MESNE ASSIGNMENTS, TO NATIONAL RUBBER MACHINERY COMPANY, OF AKRON, OHIO, A CORPORATION OF OHIO

COLLAPSIBLE CORE STRUCTURE

Application filed January 6, 1927. Serial No. 159,265.

This invention relates to collapsible cores, such as are used in the manufacture of tire casings or shoes, and more particularly to cores which are wider at the base than at the crown or substantially triangular in cross section.

One feature of the invention is directed to the provision of a collapsible core whose segmental sections may be moved into and out of the plane of operative continuity by rotating the core manually in relation to its rotary support or driving member. In the preferred embodiment illustrated, the core comprises a pair of oppositely disposed primary or key sections, which are adapted to be drawn radially inward within the core plane by the independent rotation of the whole core structure, as well as a pair of oppositely disposed supplemental or secondary sections which, after the withdrawal of the key sections, are adapted to be pulled forwardly out of the core plane with the tire thereon and then drawn radially inward in an oblique direction by their independent rotation in order to dismount the tire. In providing for the collapsing of the core in this manner, the key sections and secondary sections are mounted in separable hub members which may be readily connected to and disconnected from the driving member, and which may be as readily brought together or moved apart, as required. The key sections are carried by two rack bars slidable radially in guides formed in the corresponding hub member and meshing with a pinion fast to the driving member but located within the hub member. Consequently, when the hub member is disconnected from the driving member, the independent rotation of the core will cause the fixed pinion, by its engagement with the slidable rack bars, to draw the key sections radially inward toward each other as above stated. During this initial operation, the two hub members remain together and turn as one, the secondary sections being held out in their normal positions. However after the key sections have been moved inwardly out of the way, the hub member which carries the secondary sections is slid axially in a forward direction onto a special extension rod or spindle attached temporarily to the driving member. This extension spindle, which of course is fixed against rotation, is adapted to interlock with a pinion mounted within the second hub member when the latter is in its forward shifted position, and said pinion meshes with two obliquely arranged or inclined rack bars slidable in corresponding guides formed in the hub member. Hence, the independent rotation of the second hub member in its forward position will cause the contained fixed pinion, by its engagement with the two inclined rack bars, to draw the secondary sections inwardly toward each other out of the tire, the rack bars by reason of their inclination passing forwardly and outwardly clear of the two sections and thus allowing them to be brought together in close compact relation. In restoring the sections to their normal operative position, the foregoing operations are simply reversed and the two hub members locked as one to the driving member, the extension spindle being detached and placed aside until the core is to be collapsed again. When the hub members are connected to the driving member, the collapsing pinions are idle, all three parts rotating together as a unit.

In the accompanying drawings, the invention has been shown merely in preferred form and by way of example, but obviously many changes and variations may be made therein and in its mode of operation which will still be comprised within its spirit. It should, therefore, be understood that the invention is not limited to any specific form or embodiment except in so far as such limitations are specified in the claims.

In the drawings:

Fig. 12 is a similar view showing the application of the interlocking plates to the opposed ends of abutting sections;

The invention has been illustrated herein in connection with a core of substantially triangular cross section, such a core forming the subject matter of my prior patent, No. 1,631,855 dated June 7, 1927, and in itself constituting no part of the invention. While the present improvements are especially applicable to cores of this type, it should be understood that they are equally applicable to cores of the other types.

Figure 1:
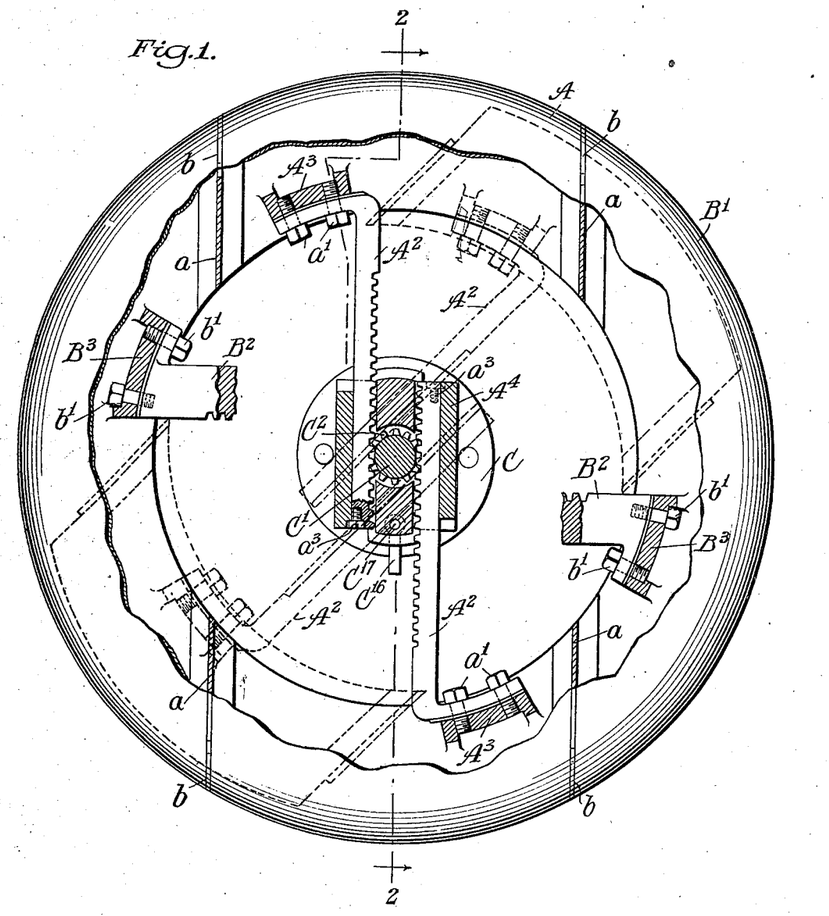
Fig. 1 is a front elevation, partly in section and partly broken away, of the improved core.
Figures 3, 4:
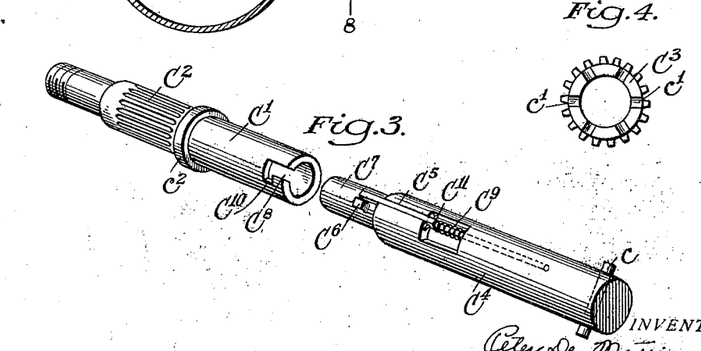
Fig. 3 is a detail perspective view of the supporting spindle and the extension therefor.
Fig. 4 is a detail face view of the loose pinion associated with the second hub member.
Figure 5:
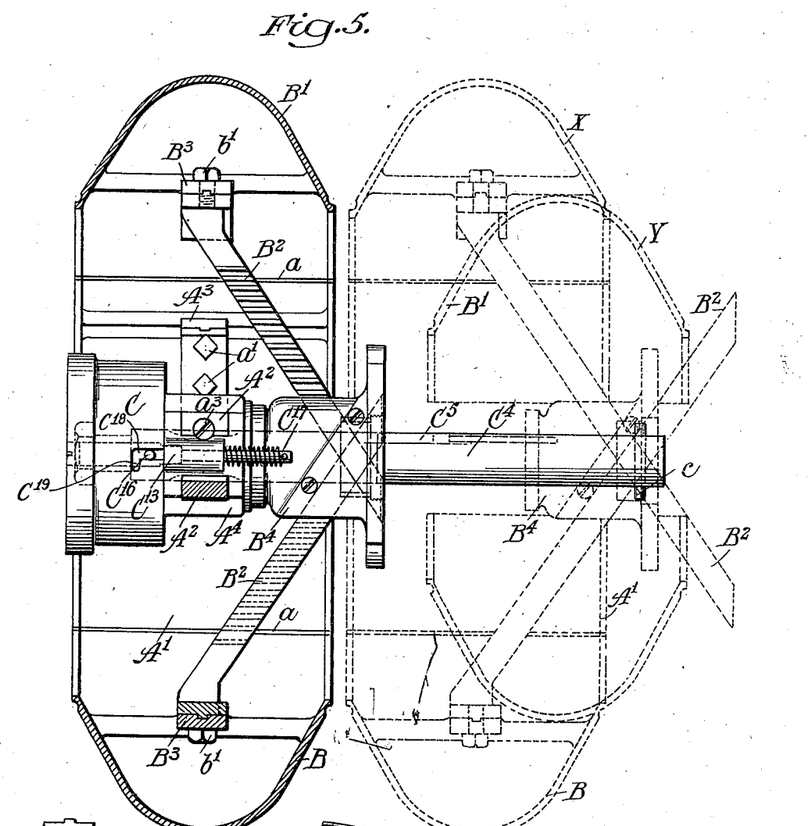
Fig. 5 is a transverse section taken on a line passing substantially horizontally and centrally through the core as shown in Fig. 1, and indicating by the dotted lines the shifted and retracted positions of the secondary core sections.
Figure 6:
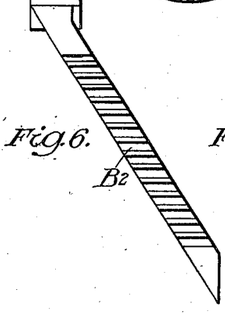
Figs. 6 and 7 are edge and side views, respectively, of one of the inclined rack bars associated with the secondary core sections.
Figure 7:
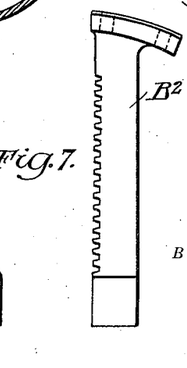
Figure 9:
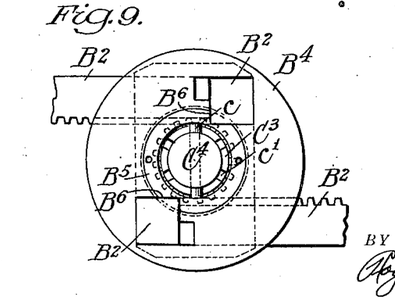
Fig. 9 is a face view of the second axially movable hub member.
Figures 10, 11:
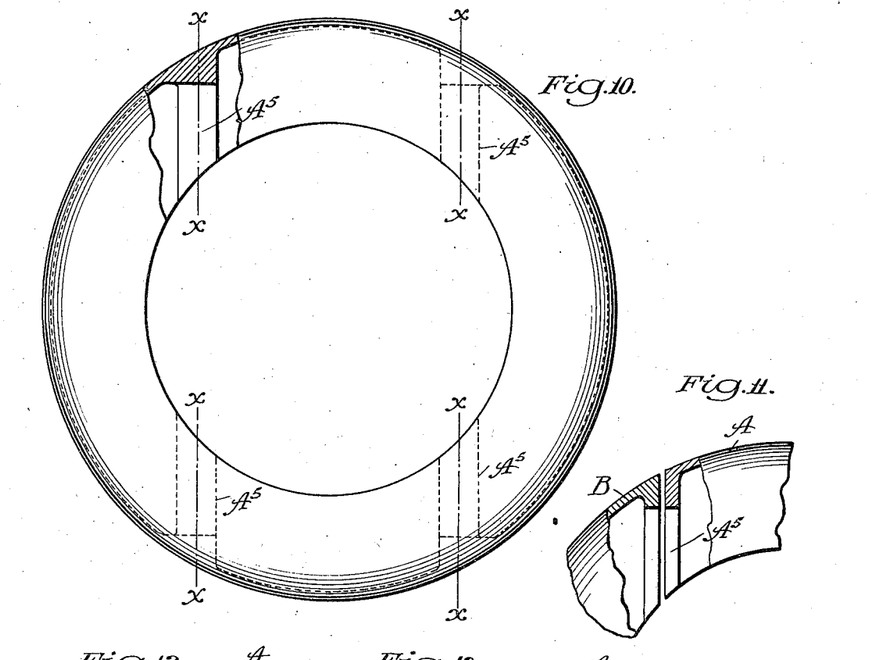
Fig. 10 is a face view, partly broken away, of the core proper as cast and before it is cut into sections.
Fig. 11 is a fragmentary view of a portion of the core showing the saw cut through the reinforcing rib.
Figure 13:
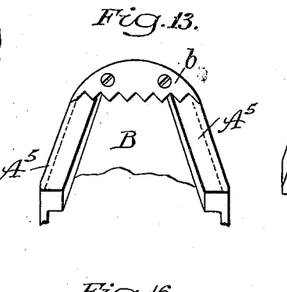
Figs. 13 and 14 are face views of the interlocking plates as attached to their respective core sections.
Figure 14:
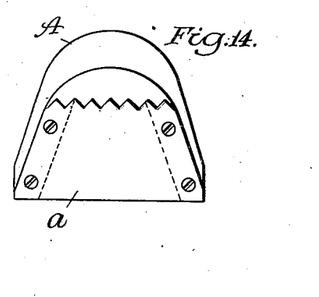
Figure 15:
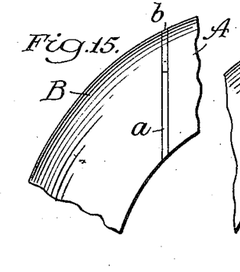
Figs. 15 and 16 are detail fragmentary views showing the relationship of the interlocking plates in their engaged and disengaged positions, respectively.
Figure 16:
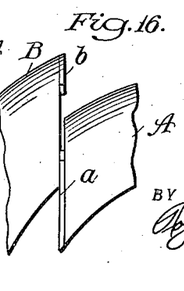

As shown in Fig. 1, the core proper comprises a pair of primary or key sections A, $A^1$, they being the first to be retracted in collapsing the core, and a pair of supplemental or secondary core sections B, $B^1$, the sections of the respective pairs being diametrically opposed to each other and arranged end to end to form a complete ring or annulus. The key sections A, $A^1$ are each provided on their opposite ends with toothed plates $a$ adapted to interlock with corresponding plates $b$ secured to the secondary sections B, $B^1$ when both pairs are brought into their normal positions of continuity and thus prevent radial and lateral displacement of the sections relatively to each other. The key sections are also provided with radially disposed rack bars $A^2$ which are secured by screw bolts $a^1$ to transverse bridge plates $A^3$ cast within the key sections, and which extend parallelly in opposite directions through a hub member $A^4$ wherein they are guided and maintained in constant mesh with a pinion $C^2$. The latter, as best shown in Fig. 3, is formed on or otherwise secured to a spindle $C^1$ which is rigidly clamped to a rotary support or driving member C. The secondary sections B, $B^1$ are likewise provided with rack bars $B^2$ secured by screw bolts $b^1$ to corresponding bridge plates $B^3$, but these bars (as indicated in Fig. 5) are inclined or disposed obliquely with reference to the plane of the core and extend through a second hub member $B^4$ wherein they are guided and maintained in constant mesh with a pinion $C^3$. This pinion, unlike the pinion $C^2$, is loosely mounted on the spindle $C^1$ and retained within the hub $B^4$ by a ring $B^5$, the latter being notched at $B^6$ (Fig. 9) to accommodate the rack bars $B^2$.

Figure 2:
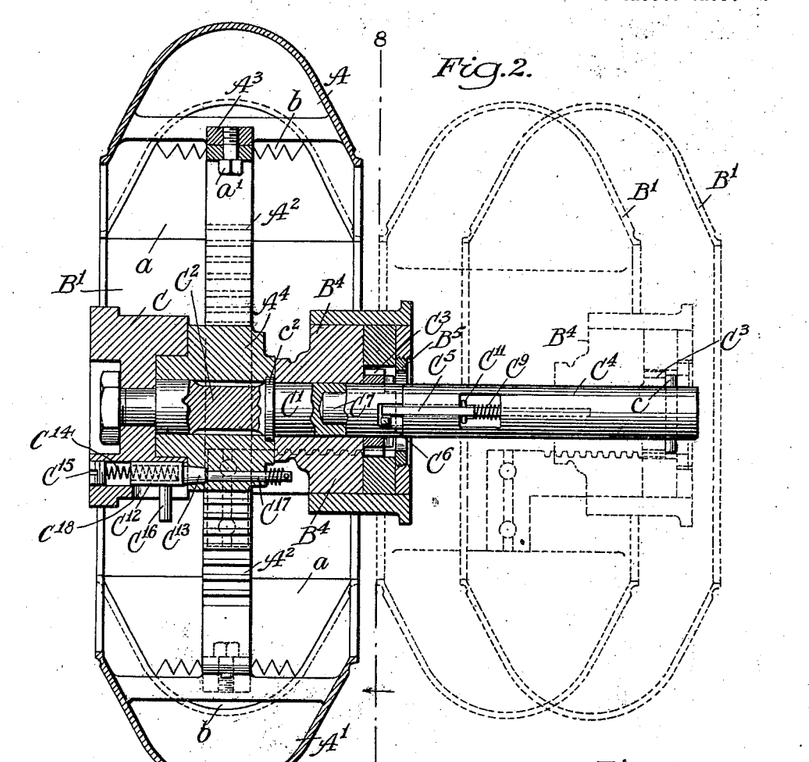
Fig. 2 is a vertical transverse section taken on the line 2—2 of Fig. 1, showing by the dotted lines the shifted and retracted positions of the core sections.

The hub member $B^4$ is journaled on the spindle $C^1$ and is capable of axial movement, back and forth, upon an extension $C^4$ so as to transport the said secondary core sections B, $B^1$ into and out of the operative plane of the core. A pin $c$ fastened transversely through the extension $C^4$ near the free end thereof serves to arrest the hub in its forward shifted position (shown at the right in Fig. 2) and is adapted at such time, for reasons later to appear, to engage in one or another pair of a series of radial notches or grooves $c^1$ formed in the outer side of the pinion $C^3$. In this connection, it will be noted that the central aperture of the retaining ring $B^5$ is sufficiently large to clear the pin $c$ when the hub member $B^4$ occupies its forward position. Preferably, the extension $C^4$ is detachably connected to the spindle $C^1$ so that it may be removed, if desired, during the building of a tire on the core. In carrying out this feature, (see Figs. 2 and 3), suitable connecting means are employed which comprise a longitudinal latch rod $C^5$ countersunk and resiliently mounted in the spindle extension $C^4$, and a lug $C^6$ rising from the reduced end portion $C^7$ thereof adjacent the rear end of said rod. The spindle $C^1$, as will be observed, is bored out to receive the reduced end portion $C^7$ of the spindle extension and is formed with a bayonet slot $C^8$, $C^{10}$, wherein the lug $C^6$ and rod $C^5$ engage when the extension is applied (Fig. 2). In attaching the extension $C^4$, it is inserted into the end of the spindle $C^1$ with the lug $C^6$ registering with the slot $C^8$, the latter, as will be noted, being just wide enough to accommodate either the lug or the end of the rod $C^5$. As the extension is pressed home, the rod $C^5$ by its engagement with the end of the spindle is forced back against the tension of the spring $C^9$, and a slight turn is then given to the extension to seat the lug in the pocket $C^{10}$ and at the same time permit the rod $C^5$ to snap into the slot $C^8$. The extension is thereby locked against relative rotation and longitudinal displacement to the spindle $C^1$. When it is desired to remove the extension, the latch rod is manually retracted from the slot $C^8$ by means of a cross pin $C^{11}$, which also serves to limit the forward thrust of said rod, and the extension is then turned to disengage the lug $C^6$ from the pocket $C^{10}$ and drawn forwardly through the slot $C^8$.

The hub member $A^4$, like its associate member $B^4$, is also journaled on the spindle $C^1$ but is held against endwise movement thereon by its engagement at one end with the driving member C and at its opposite end with a collar $c^2$ formed on the spindle. Normally, the hub member $A^4$ is connected with the driving member C and rotary motion is thus imparted to the core through the rack bars $A^2$. However, provision is made for breaking said driving connection when desired to permit the manual rotation of the core relatively to the driving member and the spindle and by such manual rotation to move the key sections inwardly from their operative position of continuity, it being understood, of course, that after the key sections A, $A^1$ are thus withdrawn, the secondary sections B, $B^1$ may be shifted forwardly out of the core plane and onto the spindle extension so as to be collapsed in a similar manner. Accordingly and in the present instance (see Fig. 2), the driving member C is provided with a retractible clutch pin $C^{12}$ having a tapered end $C^{13}$ which normally engages within a corresponding aperture formed in the hub member $A^4$. A spring $C^{14}$, seated in a recess behind the tapered end $C^{13}$ and banking against a plug $C^{15}$ screwed into the driving member, tends to hold the pin resiliently in its engaging position. Ordinarily, the retraction of the pin will be accomplished by means of a handle $C^{16}$ projecting laterally therefrom through a slot $C^{18}$ in the driving member, but in the event of binding, an auxiliary pin $C^{17}$ mounted in the hub member $A^4$ may be utilized to force it out. The slot $C^{18}$ has an offset $C^{19}$ (Fig. 5) into which the handle $C^{16}$ when withdrawn may be inserted so as to lock its handle in its disengaging position.

Figure 8:
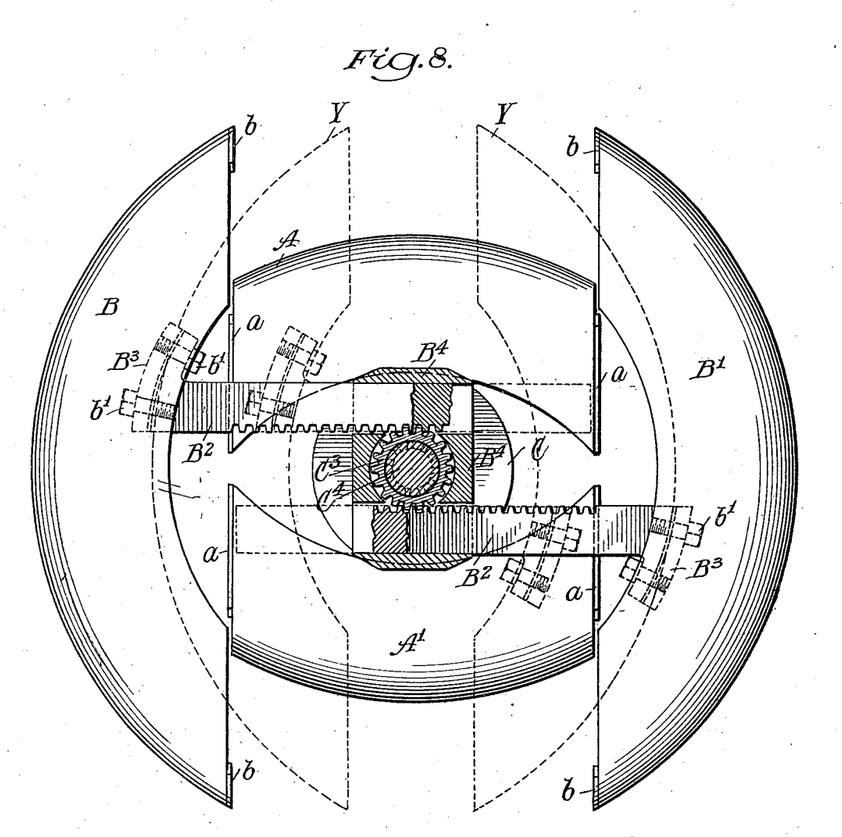
Fig. 8 is a vertical section taken on the line 8—8 of Fig. 2, showing in full lines the key sections retracted and in dotted lines the secondary sections retracted.

The operation of the parts will now be clear: When the clutch pin $C^{12}$ is withdrawn to its inactive position, the whole core structure is disengaged from the driving member C and the rigidly detached spindle $C^1$ and is free to be rotated relatively thereto. By turning the core and the tire built thereon about the spindle $C^1$ in a clockwise direction (Fig. 1), the rack bars $A^2$, through their engagement with the fixed pinion $C^2$, are then caused to move inwardly relatively to each other in opposite directions to withdraw the key sections A, $A^1$, from their respective positions of continuity within the tire, the toothed plates $a$ passing out of engagement with the toothed plates $b$ carried by the secondary sections B, $B^1$ and leaving the latter free for axial movement on the spindle $C^1$. The secondary sections B, $B^1$ with the tire thereon are next pulled forwardly by hand out of the operative plane of the core to the dotted line position indicated by the letter X in Fig. 5, the hub $B^4$ and the contained pinion $C^3$ sliding along the spindle extension $C^4$ (which has previously been attached to the spindle $C^1$ in the manner before described) until arrested by the engagement of the pinion with the transverse pin $c$ at its forward end. The pin $c$ enters one or another of the several pairs of radial grooves $c^1$ formed in the pinion $C^3$ and locks it against rotation on the spindle extension. The secondary sections B, $B^1$ with the tire thereon are now turned in the reverse direction as permitted by the loose mounting of the hub member $B^4$ upon the spindle extension $C^4$, causing the rack bars $B^2$ through their engagement with the fixed pinion $C^3$ to draw the core sections inwardly to the dotted line position indicated by the letter Y in Figs. 5 and 8. Owing to the inclination of the rack bars $B^2$, they will project forwardly and outwardly clear of the secondary sections and allow the latter to approach each other close enough to enable the tire to be removed therefrom with little or no distortion. In restoring the parts to their normal operative relation, the above operations are simply reversed, the spindle extension $C^4$ being detached after the secondary sections have been pushed back onto the main spindle $C^1$.

In order to limit the outward movement of the key sections, the rack bars $A^2$ are each provided at their inner ends with stop screws $a^3$ (see Fig. 1) which engage opposite sides of the hub member $A^4$. Similar stop screws may be applied to the rack bars $B^2$ of the secondary sections B, $B^1$ although the interlocking engagement of the toothed plates $a$ and $b$, in conjunction with the inclination of the rack bars, will overcome any tendency of the sections to move toward or away from the axis of rotation.

Attention is now directed to Figs. 10 to 16 inclusive. It is proposed to cast the core proper as an integral piece and with a series of transverse reinforcing ribs $A^5$, and then to saw the core into the sections desired, the saw cuts being made through said ribs as indicated by the broken lines $x$—$x$ in Fig. 10. This simple method of producing a sectional core is much more economical and insures a greater degree of perfection than would be the case if the core sections were cast individually from separate patterns. Moreover, the interlocking plates $a$ and $b$, if made to correspond in thickness to the width of the saw cuts, will absolutely preserve the original annularity of the core when the sections thereof are matched up.

Having thus described my invention, its construction, and mode of operation, what I claim and desire to secure by Letters Patent of the United States is as follows:

1. A collapsible core structure comprising a plurality of segmental core sections, a rotary support, disengageable connections between the core and the support to permit the rotation of the core relatively to the support, and means actuated by such relative rotation of the core for moving certain of the sections into and out of the position of operative continuity.

2. A cllapsible core structure comprising a plurality of segmental core sections including a pair of key sections, a rotary support, means for disconnecting the core from the support to permit the relative rotation of the core, means actuated by such relative rotation of the core for moving the key sections into and out of the position of operative continuity, and means whereby the remaining core sections may be shifted axially into and out of the operative plane of the core.

3. A collapsible core structure comprising a plurality of segmental core sections including a pair of key sections, a rotary support, means for disconnecting the core from the support to permit the relative rotation of the core, means actuated by such relative rotation of the core for moving the key sections into and out of the position of operative continuity, means whereby the remaining core sections may be shifted axially into and out of the operative plane of the core, and means for moving the latter sections into and out of their normal relative positions when located out of the core plane.

4. A collapsible core structure comprising a plurality of segmental core sections arranged in pairs, the sections of the respective pairs being diametrically opposed to each other, a rotary support, means for disconnecting the core from the support to permit the relative rotation of the core, means actuated by such relative rotation of the core for moving the sections of one pair within the plane of the core into and out of the position of operative continuity, means whereby the sections of another pair may be shifted axially into and out of the operative plane of the core, and means for moving the latter sections when located out of the core plane into and out of their normal relative positions.

5. A collapsible core structure comprising a pair of key core sections and a pair of secondary core sections, a rotary support having a spindle secured thereto, means for moving the key sections radially within the operative plane of the core out of the position of operative continuity, means whereby the secondary sections may be shifted axially out of the core plane along the spindle, and means for collapsing the secondary sections in their shifted position, said collapsing means being operable by the rotation of the secondary sections relatively to the rotary support and spindle.

6. A collapsible core structure comprising a pair of key core sections and a pair of secondary core sections, a rotary support, means for disconnecting the core from the support to permit the relative rotation of the core, means actuated by such relative rotation of the core for collapsing the key sections, and means whereby the secondary sections and the collapsed key sections may be shifted axially, one pair relatively to the other, to permit the collapse of the secondary sections.

7. A collapsible core structure comprising a key core section and a plurality of secondary core sections, a rotary support, means for disconnecting the core from the support to permit the relative rotation of the core, means actuated by such relative rotation of the core for moving the key section into and out of the position of operative continuity, means whereby the secondary sections may be shifted axially out of the operative plane of the core, and means actuated by the rotation of the shifted core sections relatively to the support for moving them into and out of their normal relative positions.

8. A collapsible core structure comprising a plurality of segmental core sections, a rotary support, means for disconnecting the core from the support to permit the relative rotation of the core, a spindle fastened to the support, two hub members mounted on the spindle and wherein the core sections are supported, one of said hub members being movable axially away from the other to carry certain core sections out of the operative plane of the core, and means associated with the respective hub members and actuated by the relative rotation of the core for moving the corresponding sections into and out of their normal relative positions.

9. A collapsible core structure comprising a plurality of segmental core sections including one or more key sections, a rotary support, a hub member normally engaged therewith, disengageable connections between the hub member and the support to permit the rotation of the core relatively to the support, and means actuated by such relative rotation of the core to move the key section or sections into and out of the position of operative continuity.

10. A collapsible core structure comprising a plurality of segmental core sections including one or more key sections, a rotary support, a hub member normally engaged therewith but capable of being disengaged therefrom to permit the rotation of the core relatively to the support, and means actuated by such relative rotation of the core to move the key section or sections into and out of the position of operative continuity, said means comprising a pinion locked against rotation to the support, and a radially movable rack bar secured to each key section and slidably mounted in the hub member in constant mesh with said pinion.

11. A collapsible core structure comprising a pair of key core sections and a plurality of secondary core sections, means for moving the key sections radially to and from the position of operative continuity, rack bars connected to the secondary sections, a rotary support having a spindle secured thereto, a hub member loosely mounted on the spindle and slidable axially thereon to transport the secondary sections out of the operative plane of the core, a loose pinion carried by the hub member and meshing with said rack bars, and means for locking the pinion to the spindle in the transported position of the secondary sections, whereby the rotation of the secondary sections relatively to the spindle will cause them to be moved into and out of their normal relative positions.

12. A collapsible core structure comprising a plurality of segmental core sections, including one or more key sections, a rotary support, a clutch pin for locking the core to the support but capable of being withdrawn to permit the relative rotation of the core, means actuated by such relative rotation of the core to move the key section or sections into and out of the position of operative continuity, and interlocking means between adjacent sections for maintaining them in their respective positions of operative continuity.

13. A collapsible core structure comprising a plurality of segmental core sections including one or more key sections, a rotary support, means for disconnecting the core from the support to permit the rotation of the core relatively to the support, means actuated by such relative rotation of the core in one direction to move the key section or sections out of the position of operative continuity, means whereby the remaining sections may be shifted axially out of the operative plane of the core, and means actuated by the relative rotation of the core in the opposite direction to move the shifted core sections out of their normal relative positions.

14. A collapsible core structure comprising a plurality of segmental core sections provided with rack bars, a rotary support having a spindle secured thereto, a pinion fast to the spindle, a hub member loosely mounted on the spindle and wherein the rack bars of certain core sections are maintained in mesh with said pinion, means for connecting and disconnecting said hub member to and from the support, a second hub member movable axially on the spindle and wherein the rack bars of the other core sections are guided, a loose pinion meshing with the latter rack bars, and movable with said second hub member, and means for locking the loose pinion to the spindle in the shifted position of the second hub member.

15. A collapsible core structure comprising a plurality of segmental core sections, a centrally disposed spindle whereon the sections are supported, an extension detachably secured to the spindle, means whereby certain of said core sections may be shifted axially out of the operative plane of the core onto said extension, and means for moving the shifted core sections into and out of their normal relative positions.

16. A collapsible core structure comprising a plurality of segmental core sections, a centrally disposed spindle whereon the sections are supported, an extension detachably secured to the spindle, means whereby certain of said core sections may be shifted axially out of the operative plane of the core onto said extension, a pinion loosely mounted on the spindle and movable with the shifted core sections, and an arresting pin fastened transversely to the outer end of the extension and arranged to engage radial grooves formed in the pinion to lock the latter against rotation thereon, for the purpose described.

17. A collapsible core structure comprising a plurality of segmental core sections, a centrally disposed spindle whereon the sections are supported, an extension for said spindle, a hand-controlled latch key for locking the extension to the spindle, and means whereby certain of said core sections may be shifted axially out of the operative plane of the core onto said extension.

18. A collapsible core structure comprising a plurality of segmental core sections, a rotary support with which the core is normally and operatively connected, and a clutch pin retractible at will to disconnect the core from the support, for the purpose described.

19. A collapsible core structure comprising a plurality of segmental core sections divided into groups, means for first collapsing the sections of one group, means whereby the sections of a different group may subsequently be shifted axially out of the core plane, and means for collapsing the latter sections when in their shifted position.

20. A collapsible core structure comprising a plurality of segmental core sections divided into groups, means for first collapsing the sections of one group in the operative plane of the core, means whereby the sections of a different group may subsequently be shifted without collapsing out of the core plane, and means for collapsing the latter sections while located out of the core plane.

21. A collapsible core structure comprising a pair of key core sections and a pair of secondary core sections, interlocking means for holding the sections together in the position of operative continuity, means for first drawing the key sections inwardly toward each other to disengage the interlocking means and to position them out of the way of the secondary sections, means whereby the secondary sections may then be moved axially out of the operative plane of the core clear of the key sections, and means for subsequently drawing the secondary sections inwardly toward each other to complete the collapsing of the core.

22. A collapsible core structure comprising a pair of key core sections and a pair of secondary core sections, interlocking means for holding the sections together in the position of operative continuity, means for first drawing the key sections inwardly toward each other within the plane of the core to disengage the interlocking means and to position them out of the way of the secondary sections, means whereby the secondary sections may then be moved axially out of the core plane clear of the key sections, and means for subsequently drawing the secondary sections inwardly toward each other in a diagonal direction to complete the collapsing of the core.

23. A collapsible core structure comprising a plurality of segmental core sections divided into groups, means for first collapsing the sections of one group without collapsing the sections of a different group, means whereby the several groups may then be shifted axially, one relative to another to locate the sections of the uncollapsed group out of the operative plane of the core, and means for collapsing the sections of the latter group.

24. A collapsible core structure comprising a pair of key core sections and a pair of secondary core sections, interlocking means formed on the adjacent ends of the key and secondary sections, a rotary supporting spindle, two hub members normally rotatable with the spindle but capable of an independent rotation thereon, rack bars slidably mounted in each hub member and connected to the core sections of the corresponding group, an actuating pinion associated with each hub member and fast to the spindle during the independent rotation of said hub member, the two hub members being rotatable as one upon the spindle to effect the collapsing of the key sections without collapsing the secondary sections, and the hub member for the secondary sections being rotatable alone upon the spindle to effect the collapsing of the secondary sections.

25. A collapsible core structure comprising a pair of key core sections and a pair of secondary core sections, interlocking means formed on the adjacent ends of the key and secondary sections, a rotary supporting spindle, two hub members normally rotatable with the spindle but capable of an independent rotation thereon, rack bars slidably mounted in each hub member and connected to the core sections of the corresponding group, an actuating pinion associated with each hub member and fast to the spindle during the independent rotation of said hub member, the two hub members being rotatable as one upon the spindle to effect the collapsing of the key sections without collapsing the secondary sections, and the hub member for the secondary sections being movable axially on the spindle away from the other hub member to locate said sections out of the operative plane of the core, and then rotatable alone on the spindle to effect the collapsing of said sections.

26. A collapsible core structure comprising a pair of key core sections and a pair of secondary core sections, a rotatable supporting spindle, an extension detachably connected to the spindle, means for collapsing the key sections, and means whereby the secondary sections may then be shifted out of the core plane and drawn together in collapsed condition, the said means including a hub member carrying the secondary sections and slidable off the supporting spindle onto the extension, a pinion slidable with the hub member and arranged in the shifted position of parts to be locked against rotation to the spindle extension, and a pair of obliquely arranged rack bars connected to the secondary sections and slidably mounted in the hub member in mesh with the rack pinion.

27. A collapsible core structure comprising a plurality of core sections of substantially triangular cross section and adapted to abut in the form of an annulus, a spindle whereon the core is independently rotatable, and collapsing means operatively connected respectively with the core sections and with the spindle and actuated by such independent rotation of the core to effect its collapse.

In testimony whereof, I have affixed my signature hereto.

PETER DE MATTIA.